Feb. 20, 1951  R. MULDER  2,542,424
CLAMP FOR SCAFFOLDING AND LIKE STRUCTURES
Filed Nov. 6, 1947
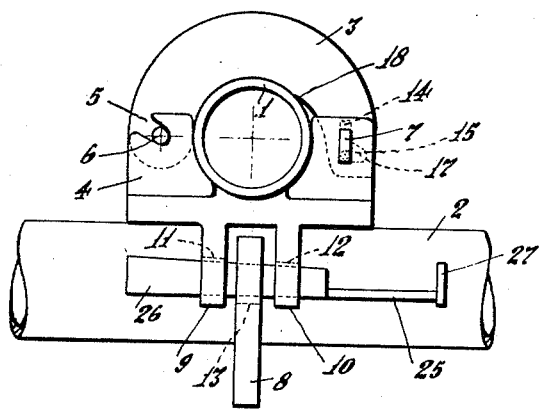
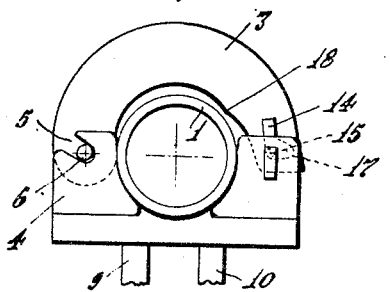
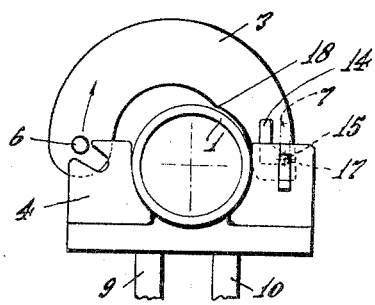
Inventor:
Rudolf Mulder
By C. F. Wenderoth
Atty Patented Feb. 20, 1951

2,542,424

UNITED STATES PATENT OFFICE 2,542,424

CLAMP FOR SCAFFOLDING AND LIKE STRUCTURES

Rudolf Mulder, Haarlem, Netherlands

Application November 6, 1947, Serial No. 784,444
In the Netherlands November 13, 1946

2 Claims. (Cl. 304—40)

1

The invention relates to a clamp for scaffolding and like structures in which two piles, pipes or like elements are supported crosswise in a pair of beds or supports, one for each pipe, to each of which beds a clamping strap is hingedly connected, each strap being adapted to be locked in the clamping position by means of a key or wedge.

The known clamps of this type have the drawback that the wedge constitutes a separate element easily liable to get lost.

The invention has for its object to remove this drawback and moreover to adapt the clamp for mass-production by stamping.

The invention consists in this, that each wedge is provided with an extension adapted to operate as a hinge pin for the clamping strap and about which the clamping strap can swing after having been shifted longitudinally by reason of the fact, that said extension has such a clearance or freedom of movement in an opening of the clamping strap that the latter, the clamping surface of which is provided with a locally eccentric portion, is movable from the coupling-position into a position allowing the clamping strap to be swung open.

Thus a wedge is obtained adapted to operate as a hinge pin and not liable to get lost.

According to the invention the wedge-extension at its end remote from the wedge may be provided with a projection e. g. a lug, which can not be passed through the adjacent wedge-aperture in the pipe-bed or support.

Further according to the invention the opening in the clamping strap may have such a shape that it enables the hinge pin to be shifted upwardly and thereafter the corresponding strapend to be shifted obliquely upwards.

The extension of the wedge operating as a hinge pin may have a circular cross section considerably smaller than the average cross section of the wedge, however without being limited thereto.

The invention will be more fully understood with reference to the accompanying drawings illustrating it by way of example.

Fig. 1 is a side elevation of a clamp according to the invention in the clamping position, one clamping strap with associated bed or support only having been shown completely.

Fig. 2 shows the clamping strap in the position in which the wedge has been removed from clamping position and with its extension is located in the apertures of the strap and the pipe-bed, and in which the strap at the wedge end has been shifted upwardly.

2

Fig. 3 shows the clamping strap in an unlocked position, from which it may be swung open about the extension of the wedge as a hinge pin.

1 and 2 denote a pair of pipes crossing each other perpendicularly and coupled by a clamp according to the invention. Only for the pipe 1 the corresponding clamping strap with associated bed or pipe support has been fully shown. The bed for the pipe 2 may be integral with the bed for the pipe 1. The clamping strap 3 in Fig. 1 at its one end is located between two upstanding parts (lugs) 4 of the corresponding bed, each lug 4 having an outwardly open recess 5. In each recess 5 one end of a pin or bolt 6 is received, which is rigidly secured to the strap transversely to the strap surface.

In Fig. 1 the pin occupies the position in which it pulled against the bottom of the recesses and is prevented from leaving the recesses in vertical direction. Diametrically opposite the pin 6 a wedge 7 passes through holes in a pair of spaced lugs of the pipe-bed and through an opening in the strapend between said lugs. This appears from Fig. 1 for the clamping strap 6 of the pipe 2; the lugs of the bed of the pipe 2 are denoted by 9 and 10 and the holes therein by 11 and 12 while the opening in the strap 8 is denoted by 13. This opening, and correspondingly the opening 14 in the strap 3, has a particular shape. The wedge 7, namely, is provided with an extension 15 (see 25 of the wedge 26) which in this embodiment has a circular cross section and is considerably smaller than the average cross section of the wedge.

This extension, carrying at one end a lug (see 27 on 25) which cannot be passed through the hole in the lug of the pipe-bed (see 12) constitutes—when the wedge has been removed from clamping position, i. e. has been shifted from this position in its longitudinal direction—a hinge pin for the clamping strap 3 and then is located in the holes of the corresponding bed lugs and in the opening 14 of the strap 3.

In this opening the hinge pin 15 (25) has some clearance upwardly (see also Fig. 2 in which the pin and the corresponding strapend have been moved upwardly) and laterally. The strap, namely, can be moved from the position of Fig. 2 to the left into the position of Fig. 3 by reason of the fact that the opening 14 is enlarged at 17. This enlargement allows the strap to be shifted not only laterally but also upwardly; the resulting displacement is obliquely upwards, whereby the pin 6 is moved from the position of Figs. 1 and 2 respectively into the position of Fig. 3, free from the pipe-bed lugs. Now, the strap may be swung open from the position of Fig. 3 about the pin 15 (25) as a hinge pin.

As appears from the drawings, the shape of the clamping surface of the strap has been adapted to the lateral displacement of the strap. To this end the clamping surface at 18 diverges with respect to the pipe surface, i. e. is eccentric.

The operation of the clamp will be clear from the foregoing.

The wedge instead of having an extension of circular cross section might have e. g. a conical extension having in the opening 14 the same clearance as the hinge pin 15 (25).

It is essential, that the shape of this opening and the cross section of the extension within the opening are correlated so that the strap with the pin 6 may be removed from the lugs of the pipe-bed.

I claim:

1. A scaffolding clamp and the like for connecting a pair of elements in crosswise relationship comprising a pair of clamping members, each said clamping member comprising an element supporting bed, a first set of upstanding lugs spacedly arranged on said bed and each having an outwardly opening recess in one end thereof, a second set of upstanding lugs spacedly arranged on said bed in alignment with said first lugs and each having a wedge receiving opening therethrough, a clamping strap having an eccentrically shaped portion on the clamping surface thereof, a pin secured on an end of said clamping strap and adapted for insertion in said outwardly opening recesses, said clamping strap having a wedge receiving opening therethrough in the end remote from said pin bearing end, a wedge inserted through the openings in said second lugs and said clamping strap, said wedge having an extension thereon of smaller dimensions than the remainder of said wedge, said wedge being shiftable in said openings whereby said extension is located in said openings and serves as a hinge pin for said clamping strap, said opening in said clamping strap permitting a lateral and vertical shifting of said clamping strap with relation to said lugs whereby said pin is released from said outwardly opening recesses and said clamping strap is swingable about said extension for releasing one said element.

2. A scaffolding clamp as claimed in claim 1, said opening in said clamping strap being substantially L-shaped, the upright portion thereof accommodating said wedge when said clamping strap is in clamping position, said extension of said wedge forming said hinge pin being shiftable upwardly in said opening and said clamping strap being shiftable obliquely upwards after the shifting of said extension, said eccentric portion of said clamping strap permitting said shifting of said clamping strap with relation to one said element.

RUDOLF MULDER.

REFERENCES CITED

The following references are of record in the file of this patent:

UNITED STATES PATENTS

| Number | Name | Date |
| --- | --- | --- |
| 894,104 | Batt et al. | July 21, 1908 |
| 1,050,816 | Deslauriers | Jan. 21, 1913 |
| 1,194,209 | Middaugh | Aug. 8, 1916 |
| 1,706,214 | Davidson | Mar. 19, 1929 |
| 1,706,801 | Merrill | Mar. 26, 1929 |
| 2,165,221 | Burton | July 11, 1939 |
| 2,198,262 | Bergan | Apr. 23, 1940 |
| 2,210,465 | Orsenigo | Aug. 6, 1940 |